United States Patent
Lee et al.

(10) Patent No.: US 12,417,044 B2
(45) Date of Patent: Sep. 16, 2025

(54) STORAGE DEVICE DISTRIBUTING BAD MEMORY UNITS IN SUPER MEMORY BLOCK AND OPERATING METHOD OF THE STORAGE DEVICE

(71) Applicant: SK hynix Inc., Gyeonggi-do (KR)

(72) Inventors: Jae Il Lee, Gyeonggi-do (KR); Dong Hwan Koo, Gyeonggi-do (KR); Duck Joo Lee, Gyeonggi-do (KR); Joon Ho Lee, Gyeonggi-do (KR); Young Hoon Cha, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/463,289

(22) Filed: Sep. 8, 2023

(65) Prior Publication Data
US 2024/0354019 A1  Oct. 24, 2024

(30) Foreign Application Priority Data

Apr. 19, 2023  (KR) .................. 10-2023-0051046

(51) Int. Cl.
*G06F 3/06* (2006.01)
(52) U.S. Cl.
CPC ............ *G06F 3/064* (2013.01); *G06F 3/0619* (2013.01); *G06F 3/0679* (2013.01)
(58) Field of Classification Search
CPC .................................................. G06F 12/0877
See application file for complete search history.

(56) References Cited

U.S. PATENT DOCUMENTS

| | | | | |
|---|---|---|---|---|
| 8,612,804 | B1* | 12/2013 | Kang ................. | G06F 12/0238 714/42 |
| 8,898,373 | B1* | 11/2014 | Kang ................. | G06F 12/0246 711/E12.008 |
| 10,372,355 | B2 | 8/2019 | Huang et al. | |
| 2013/0054881 | A1* | 2/2013 | Ellis ................... | G06F 12/0246 711/E12.008 |
| 2017/0262218 | A1* | 9/2017 | Chiang ............... | G06F 3/0611 |
| 2020/0394133 | A1* | 12/2020 | Carpenter .......... | G06F 12/0246 |
| 2021/0365200 | A1* | 11/2021 | Alwala ............... | G06F 3/0604 |
| 2022/0121375 | A1* | 4/2022 | Kim .................... | G06F 3/0616 |
| 2023/0195379 | A1* | 6/2023 | Kientz ................ | G06F 3/0658 711/154 |

FOREIGN PATENT DOCUMENTS

KR   10-2022-0036468 A    3/2022

* cited by examiner

*Primary Examiner* — Prasith Thammavong
(74) *Attorney, Agent, or Firm* — IP & T GROUP LLP

(57) ABSTRACT

When it is determined that a first super memory block among a plurality of super memory blocks satisfies an exchange condition, the storage device may exchange a first memory unit in the first super memory block with a second memory unit included in a second super memory block among the plurality of super memory blocks. In this case, the first memory unit is a bad memory unit and the second memory unit is a normal memory unit.

18 Claims, 11 Drawing Sheets

STORAGE DEVICE DISTRIBUTING BAD MEMORY UNITS IN SUPER MEMORY BLOCK AND OPERATING METHOD OF THE STORAGE DEVICE

CROSS-REFERENCES TO RELATED APPLICATION

The present application claims priority under 35 U.S.C. 119 (a) to Korean patent application number 10-2023-0051046 filed on Apr. 19, 2023, which is incorporated herein by reference in its entirety.

BACKGROUND

1. Technical Field

Various embodiments of the present disclosure generally relate to a storage device which distributes bad memory units in a super memory block, and operating method thereof.

2. Related Art

A storage device is capable of storing data according to a request from an external device such as a computer, a smartphone, a tablet PC, or the like.

The storage device may include a memory for storing data therein and a controller for controlling the memory. The memory may be a volatile memory or a nonvolatile memory. The controller may receive a command from an external device (i.e., a host), and may execute or control an operation for reading, writing or erasing data with respect to the memory included in the storage device, according to the received request.

Meanwhile, some memory units included in the memory may be regarded as bad memory units that may cause malfunction. In this case, the storage device may no longer use the bad memory units.

SUMMARY

Embodiments of the present disclosure may provide a storage device capable of minimizing performance degradation due to bad memory units and increasing data processing throughput and lifetime, and an operating method thereof.

In one aspect, embodiments of the present disclosure may provide a storage device including a memory including a plurality of memory units, and a controller configured to set a plurality of super memory blocks each including one or more of the plurality of memory units; exchange, when it is determined that a first super memory block among the plurality of super memory blocks satisfies an exchange condition, a first memory unit included in the first super memory block with a second memory unit included in a second super memory block among the plurality of super memory blocks. The first memory unit may be a bad memory unit and the second memory unit may be a normal memory unit.

In another aspect, embodiments of the present disclosure may provide a method for operating a storage device including determining whether a first super memory block among a plurality of super memory blocks each including a plurality of memory units satisfies an exchange condition, and exchanging, when it is determined that the first super memory block satisfies the exchange condition, a first memory unit included in the first super memory block with a second memory unit included in a second super memory block among the plurality of super memory blocks. The first memory unit may be a bad memory unit and the second memory unit may be a normal memory unit.

In another aspect, embodiments of the present disclosure may provide a storage device including a memory including at least first and second super memory blocks; and a controller configured to exchange, when the first super memory block has a greater number of bad memory blocks than a threshold, one of the bad memory blocks with a normal memory block having a least number of erase counts within the second super memory block having a less number of bad memory blocks than the first super memory block.

According to the embodiments of the present disclosure, it is possible to minimize performance degradation due to bad memory units and increase data processing throughput and lifetime.

DETAIL DESCRIPTION

Figure 1:
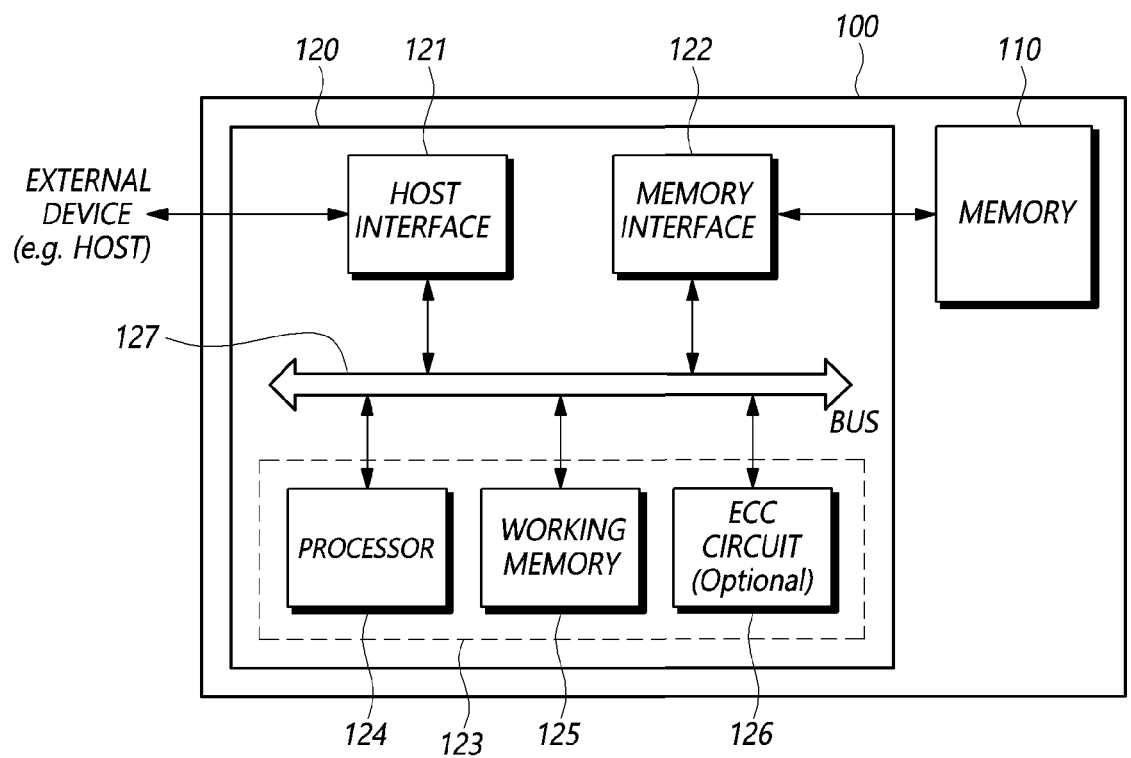
FIG. 1 is a schematic configuration diagram of a storage device according to an embodiment of the present disclosure.

Hereinafter, embodiments of the present disclosure are described in detail with reference to the accompanying drawings. Throughout this specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the present disclosure.

Referring to FIG. 1, the storage device 100 may include a memory 110 that stores data and a controller 120 that controls the memory 110.

The memory 110 may include a plurality of memory blocks, and operate under the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address, which correspond to a request from an external device (e.g., a host), from the controller 120 and may access an area in the memory cell array, which is selected by the address. The memory 110 may perform an operation instructed by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and the like.

The controller 120 may control the operation of the memory 110 according to a request from the host located outside the storage device 100. The controller 120, however, also may control the operation of the memory 110 regardless of a request from the host.

The host may be a computer, an ultra mobile PC (UMPC), a workstation, a personal digital assistant (PDA), a tablet PC, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require the storage device 100 capable of storing data.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience, descriptions will describe the controller 120 and the host as devices that are separated from each other.

Referring to FIG. 1, the controller 120 may include a memory interface 122, a control circuit 123, and a host interface 121.

The host interface 121 may provide an interface for communication with the host. For example, the host interface 121 provides an interface that uses at least one from among various communication standards or interfaces such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may provide an interface between the memory 110 and the controller 120 under the control of the control circuit 123.

The control circuit 123 may perform the general control operations of the controller 120 to control the operation of the memory 110. For instance, the control circuit 123 may include a processor 124 and a working memory 125, and may further include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the present disclosure will be described as implementing a processor 124 that executes firmware in which the corresponding operation is defined.

Firmware, which is a program to be executed in the storage device 100 to drive the storage device 100, may include various functional layers. For example, the firmware may include binary data in which codes for executing the functional layers, respectively, are defined.

For example, the firmware may include at least one of a flash translation layer (FTL) which performs a translating function between a logical address requested to the storage device 100 from the host and a physical address of the memory 110; a host interface layer (HIL) which serves to analyze a command requested to the storage device 100 as a storage device from the host and transfers the command to the flash translation layer (FTL); and a flash interface layer (FIL) which transfers a command, instructed from the flash translation layer (FTL), to the memory 110.

The firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of the firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata used for driving firmware from the memory 110. The metadata, which is data for managing the memory 110, may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store firmware, a program code, a command and data. The working memory 125 may be a volatile memory that includes, for example, at least one of a SRAM (static RAM), a DRAM (dynamic RAM) and a SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in the last read data. There may be one or more sectors that are determined to be uncorrectable. The error detection and correction circuit 126 may transfer information (e.g., address information) regarding a sector which is determined to be uncorrectable to the processor 124.

A bus 127 may provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
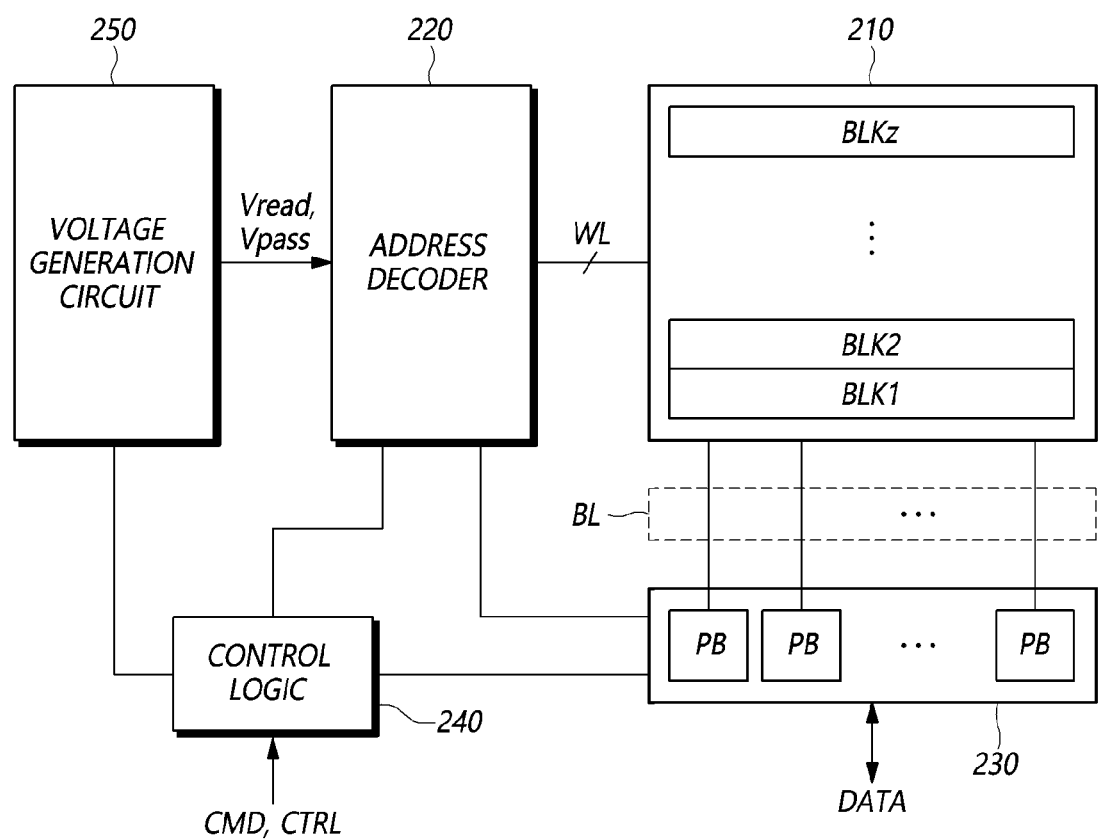
FIG. 2 is a block diagram schematically illustrating a memory of FIG. 1.

FIG. 2 is a block diagram schematically illustrating a memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array having a two-dimensional structure or may be configured by a memory cell array having a three-dimensional structure.

Each of the plurality of memory cells included in the memory cell array 210 may store at least 1-bit data. For instance, each of the plurality of memory cells included in the memory cell array 210 may be a single level cell (SLC) capable of storing 1-bit data. In another instance, each of the plurality of memory cells included in the memory cell array 210 may be a multi-level cell (MLC) capable of storing 2-bit data. In still another instance, each of the plurality of memory cells included in the memory cell array 210 may be a triple level cell (TLC) capable of storing 3-bit data. In yet another instance, each of the plurality of memory cells included in the memory cell array 210 may be a quad level cell (QLC) capable of storing 4-bit data. In a further instance, the memory cell array 210 may include a plurality of memory cells, each of which is capable of storing 5 or more-bit data.

The number of bits of data stored in each of the plurality of memory cells may be dynamically determined. For example, a single level cell that stores 1-bit data may be changed to a triple level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may operate under the control of the control logic 240.

The address decoder 220 may receive an address through an input/output buffer in the memory 110. The address decoder 220 may decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may control general operations of the memory 110 under the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
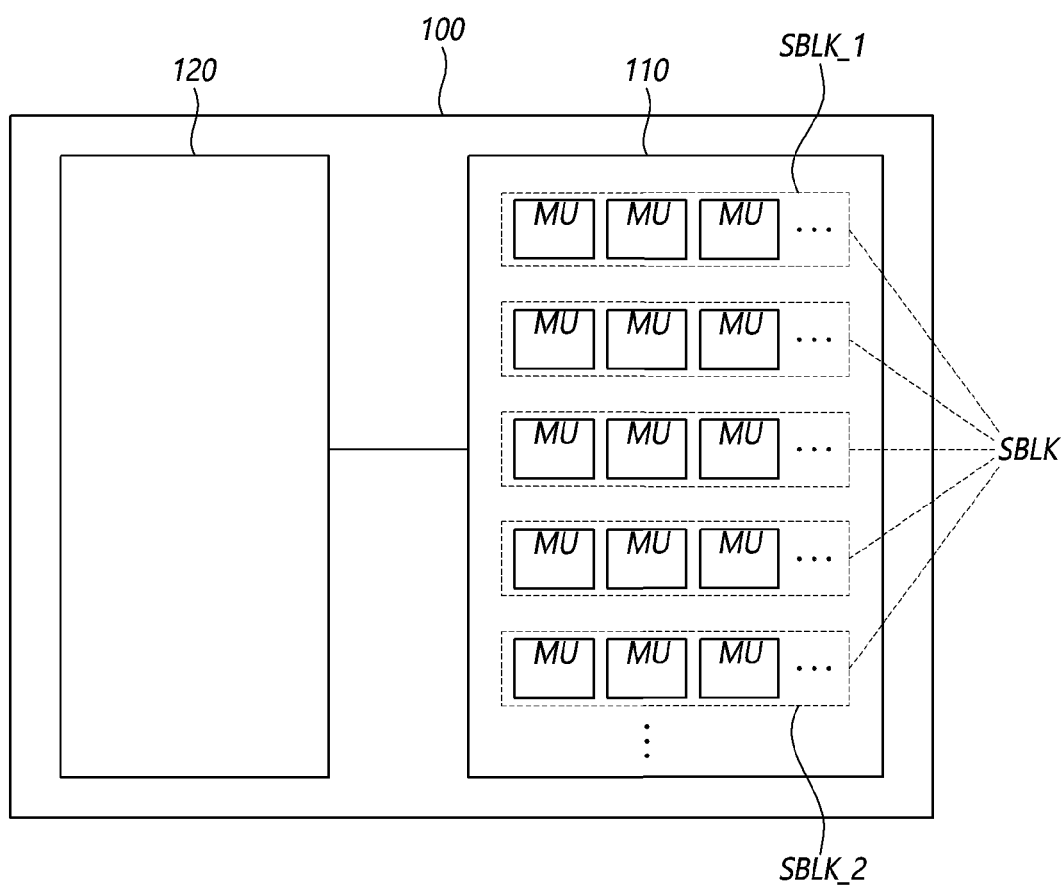
FIG. 3 illustrates schematic structures of a storage device according to embodiments of the present disclosure.

FIG. 3 illustrates schematic structures of a storage device according to embodiments of the present disclosure.

Referring to FIG. 3, the storage device 100 may include a memory 110 and a controller 120.

The memory 110 may include a plurality of memory units MU. Each of the plurality of memory units MU may store data, and consist of one or more memory blocks or one or more pages.

The memory 110 may include a plurality of memory dies (not shown), and each of the plurality of memory units MU may be located in one of the plurality of memory dies (not shown).

The controller 120 may set a plurality of super memory blocks SBLK. Each of the plurality of super memory blocks SBLK may include one or more of the plurality of memory units MU.

Memory units included in the same super memory block may be located on different memory dies. In this case, data may be simultaneously written into or read from memory units included in the same super memory block.

When it is determined that a first super memory block SBLK_1 among the plurality of super memory blocks SBLK satisfies an exchange condition, the controller 120 may exchange some memory units between the first super memory block SBLK_1 and a second super memory block SBLK_2 among the plurality of super memory blocks SBLK. Hereinafter, this will be described in detail in FIG. 4.

Figure 4:
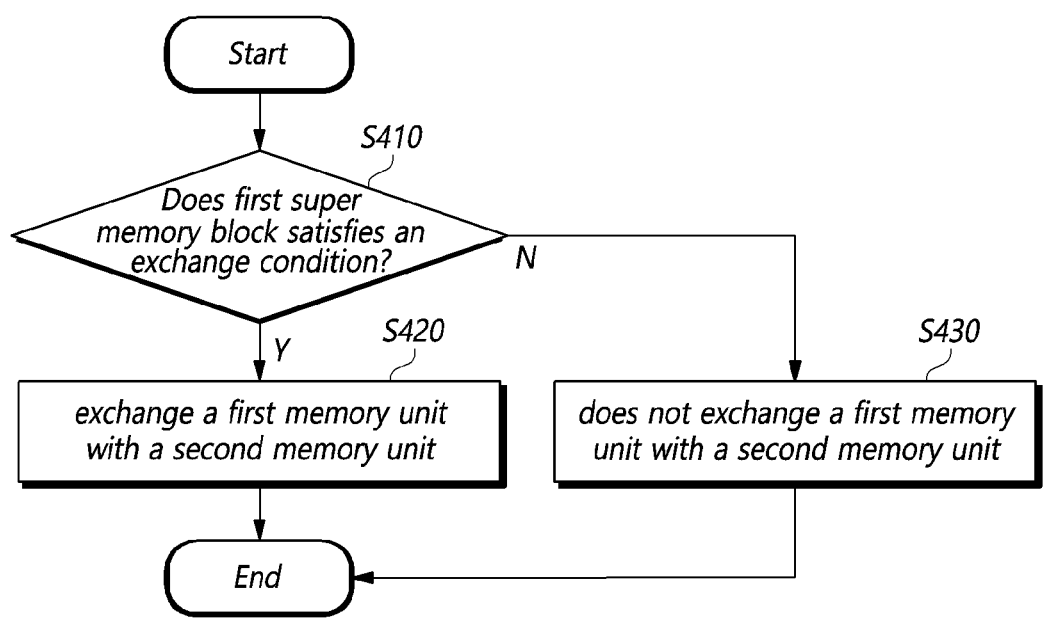
FIG. 4 is a flowchart for describing an operation of a storage device according to embodiments of the present disclosure.

FIG. 4 is a flowchart for describing an operation of a storage device according to embodiments of the present disclosure.

Referring to FIG. 4, the controller 120 of the storage device 100 may determine whether the first super memory block SBLK_1 satisfies an exchange condition (S410).

The timing at which the controller 120 determines whether the first super memory block SBLK_1 satisfies the exchange condition may be determined as follows.

For example, the controller 120 may determine, when the first super memory block SBLK_1 becomes a free super memory block, whether the first super memory block SBLK_1 satisfies the exchange condition. The controller 120 may convert the first super memory block SBLK_1 to a free super memory block by performing an erase operation on memory units included in the first super memory block SBLK_1. In this case, the controller 120 may determine whether the first super memory block SBLK_1 satisfies the exchange condition in order to exchange some of the memory units included in the first super memory block SBLK_1 with respective normal memory units of a super memory block other than the first super memory block SBLK_1.

As another example, the controller 120 may determine, before a read or write operation on the first super memory block SBLK_1, whether the first super memory block SBLK_1 satisfies the exchange condition.

As another example, the controller 120 may determine that the first super memory block SBLK_1 satisfies the exchange condition, when i) the first super memory block SBLK_1 has a bad memory unit, ii) an idle time exceeds a specific time, iii) the storage device 100 is booted up, iv) the storage device 100 is powered off or v) a background operation (e.g. garbage collection, wear leveling) is performed.

When it is determined that the first super memory block SBLK_1 satisfies the exchange condition ('Y' in S410), the controller 120 may exchange a first memory unit included in the first super memory block SBLK_1 with a second memory unit included in the second super memory block SBLK_2 (S420).

On the other hand, when it is determined that the first super memory block SBLK_1 does not satisfy the exchange condition ('N' in S410), the controller 120 may not exchange the first memory unit included in the first super memory block SBLK_1 with the second memory unit included in the second super memory block SBLK_2 (S430).

Figure 5:
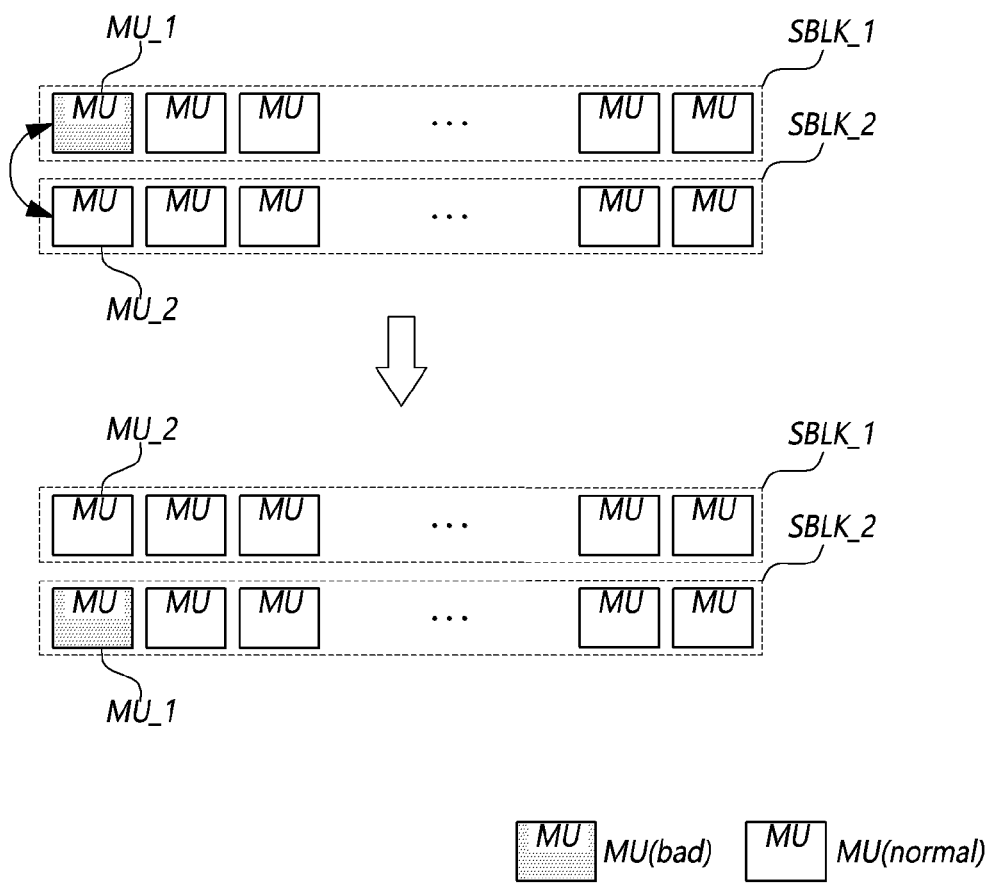
FIG. 5 illustrates an operation in which a storage device exchanges a first memory unit with a second memory unit according to embodiments of the present disclosure.

FIG. 5 illustrates an operation in which a storage device exchanges a first memory unit with a second memory unit according to embodiments of the present disclosure.

Referring to FIG. 5, the first memory unit MU_1 included in the first super memory block SBLK_1 is a bad memory unit, and the second memory unit MU_2 included in the second super memory block SBLK_2 is a normal memory unit, which is not a bad memory unit.

A plurality of memory units MU may be classified into a bad memory unit and a normal memory unit. A bad memory unit is a memory unit determined to be at a high risk of causing malfunction due to a program fail or an erase fail. A normal memory unit is a memory unit determined to be able to store data normally.

For example, the first memory unit MU_1 may become a bad memory unit during runtime. When a fail (e.g. UECC (Uncorrectable ECC), PSF (Program Status Fail)) occurs in the first memory unit MU_1 while processing a write request, read request from an external device (e.g. HOST) or performing a background operation, the first memory unit MU_1 may be registered as a bad memory unit.

As another example, the first memory unit MU_1 may be an initial bad memory unit already determined to be a bad memory unit when manufactured in a factory.

When the first memory unit MU_1 is exchanged with the second memory unit MU_2, the first memory unit MU_1 is then included in the second super memory block SBLK_2, and the second super memory unit MU_2 is then included in the first super memory block SBLK_1.

Accordingly, a number of bad memory units included in the first super memory block SBLK_1 decreases, and a number of bad memory units included in the second super memory block SBLK_2 increases.

If many bad memory units are included in the first super memory block SBLK_1, available space of the first super memory block SBLK_1 may be decreased, thereby reducing data processing throughput and QoS (Quality of Service). Also, the frequency of the wear leveling may be increased due to the first super memory block SBLK_1, and thus lifespan of the storage device 100 may decrease.

Accordingly, the controller 120 may exchange the bad memory unit included in the first super memory block SBLK_1 with the normal memory unit included in the second super memory block SBLK_2, thereby evenly distributing bad memory units among the plurality of super memory blocks SBLK.

Through this, by equalizing performance of the plurality of super memory blocks SBLK, data processing throughput and lifespan of the storage device 100 may be increased.

Hereinafter, an operation of determining whether a super memory block satisfies the exchange condition will be described.

Figure 6:
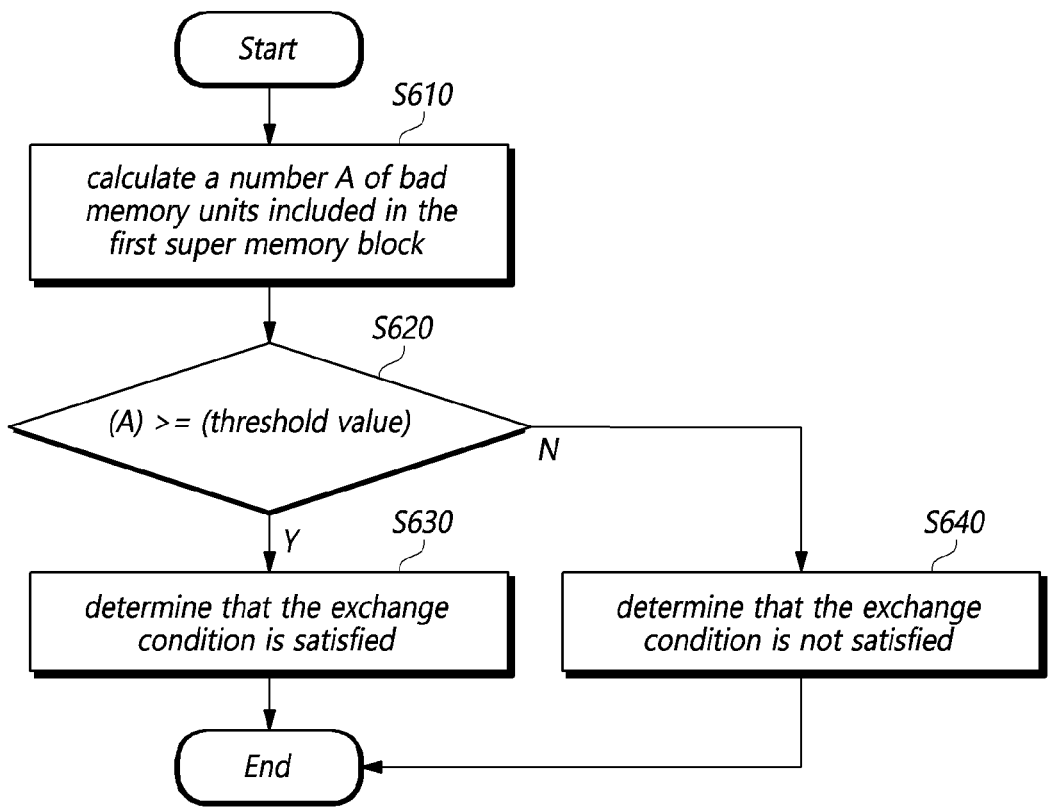
FIG. 6 is a flowchart for describing an example of an operation in which a storage device determines whether a super memory block satisfies an exchange condition according to embodiments of the present disclosure.

FIG. 6 is a flowchart for describing an example of operation in which a storage device determines whether a super memory block satisfies an exchange condition according to embodiments of the present disclosure.

Referring to FIG. 6, the controller 120 of the storage device 100 may calculate a number A of bad memory units included in the first super memory block SBLK_1 (S610).

The controller 120 determines whether the number A is equal to or greater than a threshold value (S620).

When the number A is equal to or greater than the threshold value ('Y' in S620), the controller 120 may determine that the first super memory block SBLK_1 satisfies the exchange condition (S630).

On the other hand, when the number A is less than the threshold value ('N' in S620), the controller 120 may determine that the first super memory block SBLK_1 does not satisfy the exchange condition (S640).

Figure 7:
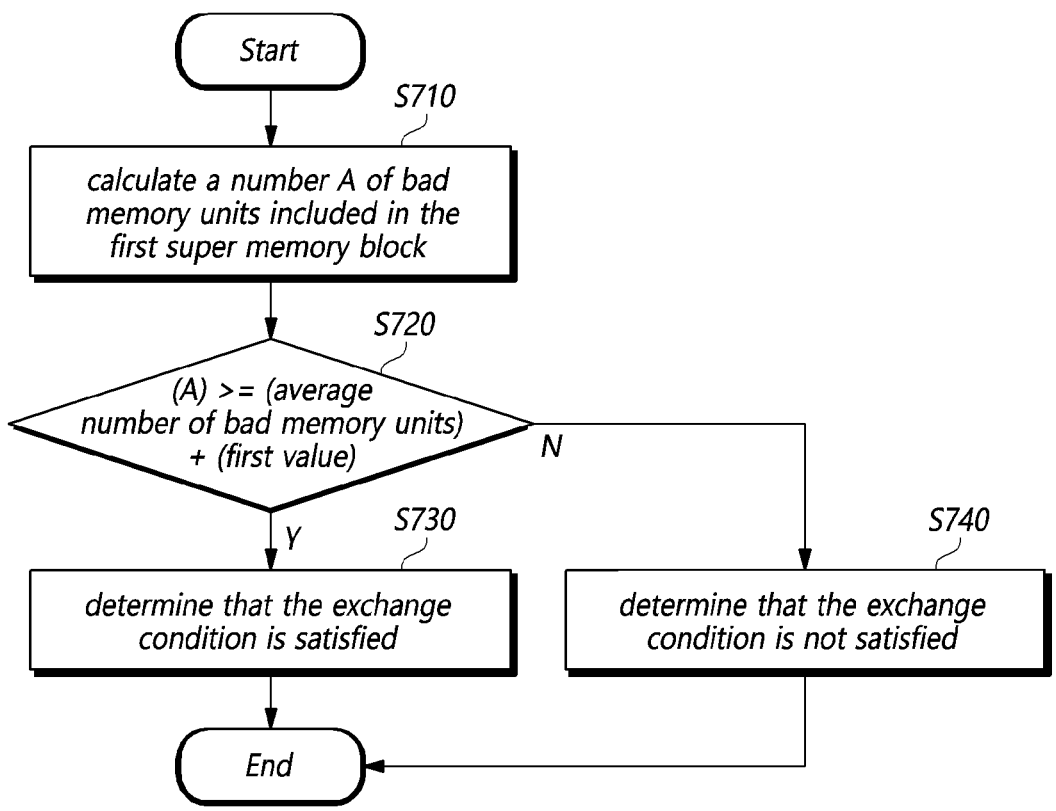
FIG. 7 is a flowchart for describing another example of an operation in which a storage device determines whether a super memory block satisfies an exchange condition according to embodiments of the present disclosure.

FIG. 7 is a flowchart for describing another example of operation in which a storage device determines whether a super memory block satisfies an exchange condition according to embodiments of the present disclosure.

Referring to FIG. 7, the controller 120 of the storage device 100 may calculate the number A of bad memory units included in the first super memory block SBLK_1 (S710).

Then, the controller 120 determines whether the number A is greater, by a first value or more, than an average number of bad memory units of the plurality of super memory blocks SBLK (S720).

For example, the first value may be a predetermined value or may be a value obtained by multiplying the average number of bad memory units by a predetermined ratio value.

When the number A is greater, by the first value or more, than the average number of bad memory units ('Y' in S720), the controller 120 may determine that the first super memory block SBLK_1 satisfies the exchange condition (S730). When the number A is greater, by the first value or more, than the average number of bad memory units, the controller 120 may determine that the bad memory units included in the first super memory block SBLK_1 need to be distributed to other super memory blocks because there are many bad memory units in the first super memory block SBLK_1.

On the other hand, when the number A is not greater, by the first value or more, than the average number of bad memory units ('N' in S720), the controller 120 may determine that the first super memory block SBLK_1 does not satisfy the exchange condition (S740).

Moreover, the controller 120 of the storage device 100 may determine whether the first super memory block SBLK_1 satisfies the exchange condition in a different way.

For example, the controller 120 may determine that the first super memory block SBLK_1 satisfies the exchange condition when a difference between a maximum and a minimum of a number of bad memory units of the plurality of super memory blocks SBLK is greater than or equal to a second value.

As another example, the controller 120 may determine that the first super memory block SBLK_1 satisfies the exchange condition when the maximum of a number of bad memory units of the plurality of super memory blocks is greater than or equal to a third value.

Figure 8:
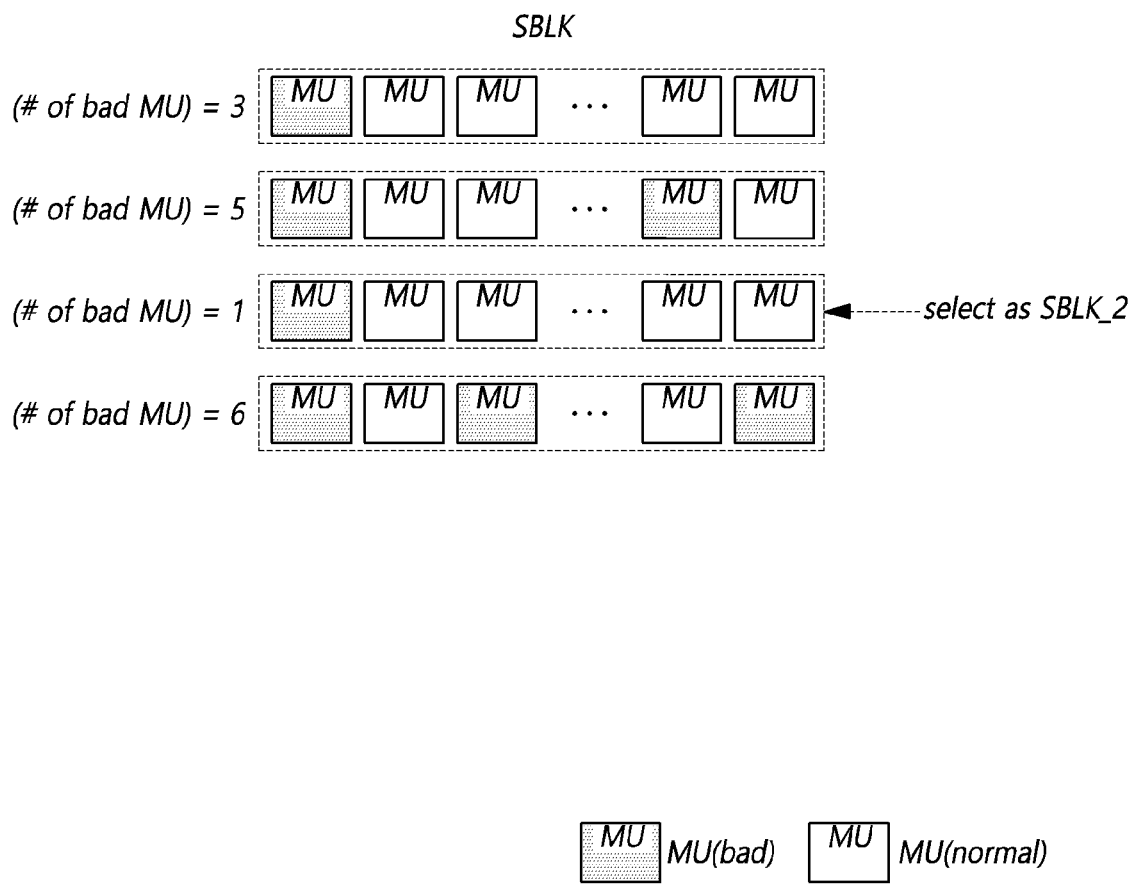
FIG. 8 illustrates an example of a storage device selecting a second super memory block according to embodiments of the present disclosure.

FIG. 8 illustrates an example of a storage device selecting a second super memory block according to embodiments of the present disclosure.

Referring to FIG. 8, the controller 120 of the storage device 100 may determine, as the second super memory block SBLK_2, a super memory block having a smallest number of bad memory units among the plurality of super memory blocks SBLK. This is because performance degradation caused by the addition of a new bad memory block to the second super memory block SBLK_2 can be minimized as the number of bad memory blocks previously included in the second super memory block SBLK_2 decreases.

In FIG. 8, the numbers of bad memory units included in the respective super memory blocks SBLK are 3, 5, 1, and 6. Accordingly, the controller 120 may determine, as the second super memory block SBLK_2, a super memory block having the smallest number of bad memory units, that is, the super memory block having the single bad memory unit.

Figure 9:
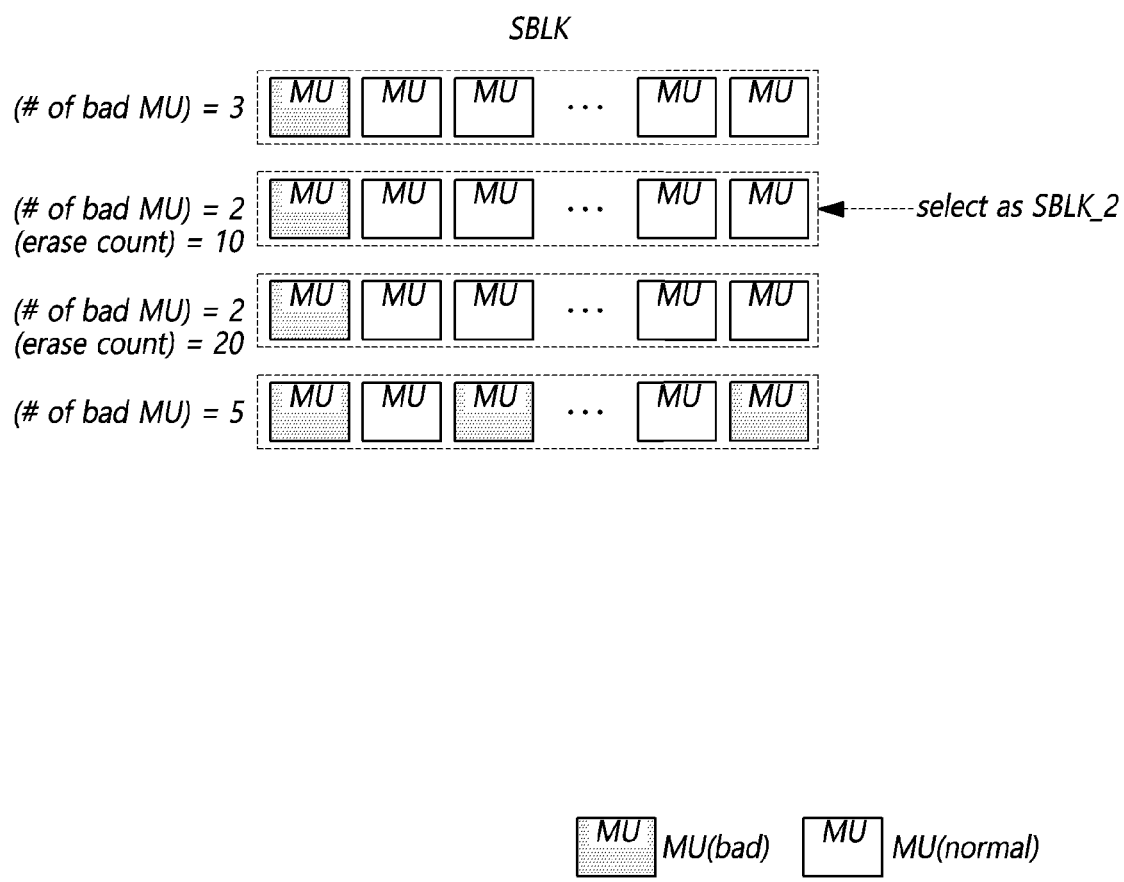
FIG. 9 illustrates another example of a storage device selecting a second super memory block according to embodiments of the present disclosure.

FIG. 9 illustrates another example of a storage device selecting a second super memory block according to embodiments of the present disclosure.

Referring to FIG. 9, when N number of super memory blocks have the smallest number of bad memory units among the plurality of super memory blocks SBLK, the controller 120 of the storage device 100 may determine, as the second super memory block SBLK_2, a super memory block having a smallest erase count among the N super memory blocks, where N is a natural number greater than or equal to 2.

For example, an erase count of a super memory block may be determined as a number of times that all memory units included in the corresponding super memory block are erased.

As another example, an erase count of a super memory block may be determined as sum or average of erase counts of memory units included in the corresponding super memory block.

In FIG. 9, the numbers of bad memory units included in the respective super memory blocks SBLK are 3, 2, 2, and 5. Accordingly, there are 2 super memory blocks having the smallest number (i.e., 2) of bad memory units.

The erase count of one of the 2 super memory blocks is 10 and the erase count of the other of the 2 super memory blocks is 20.

Therefore, the super memory block having the erase count of 10 may be determined as the second super memory block SBLK_2 among the 2 super memory blocks having the smallest number (i.e., 2) of bad memory units.

Figure 10:
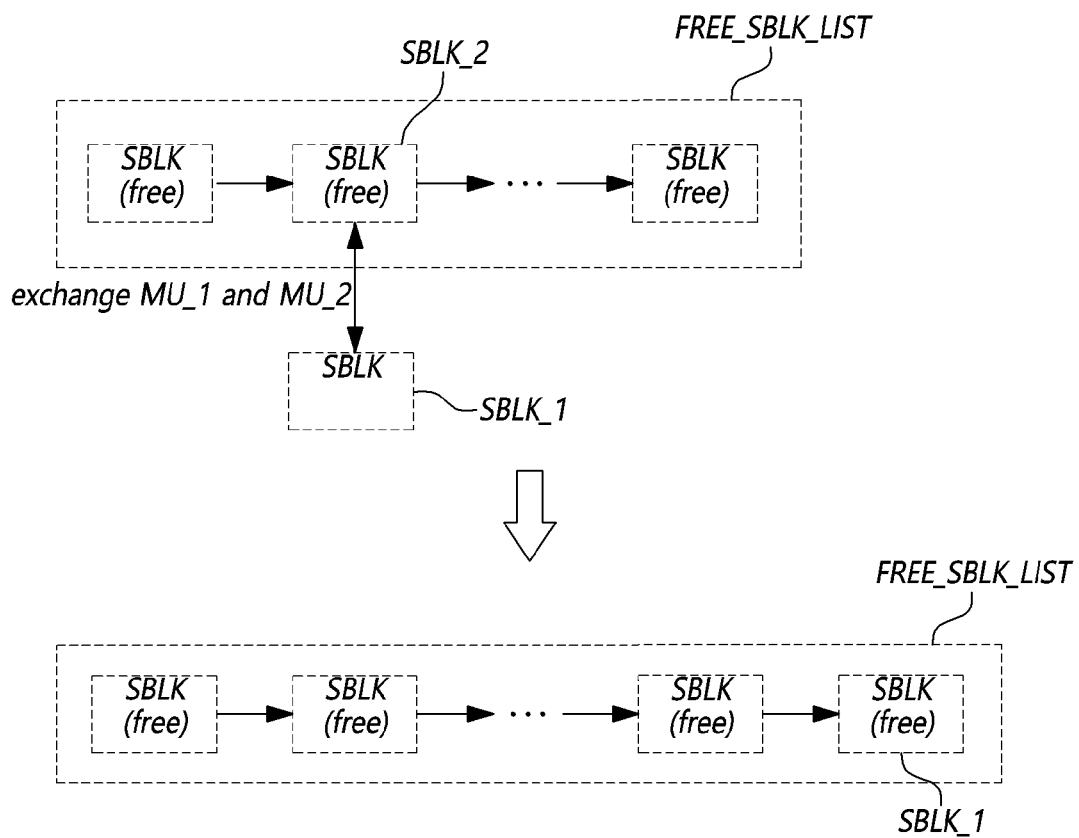
FIG. 10 illustrates an operation of a storage device managing a free super memory block list according to embodiments of the present disclosure.

FIG. 10 illustrates an operation of a storage device managing a free super memory block list according to embodiments of the present disclosure.

Referring to FIG. 10, information of free super memory blocks among the plurality of super memory blocks SBLK may be included in a free super memory block list FREE_SBLK_LIST. As described above, all memory units included in a free super memory block may be in an erased state.

Before inserting information of the first super memory block SBLK_1 into the free super memory block list FREE_SBLK_LIST, the controller 120 of the storage device 100 may exchange the first memory unit MU_1 included in the first super memory block SBLK_1 with the second memory unit MU_2 included in the second super memory block SBLK_2.

In this case, information of the second super memory block SBLK_2 may be included in the free super memory block list FREE_SBLK_LIST. That is, the second super memory block SBLK_2 may be a free super memory block.

After completing the exchange of the first memory unit MU_1 with the second memory unit MU_2, the controller 120 may insert information of the first super memory block SBLK_1 into the free super memory block list FREE_SBLK_LIST.

On the other hand, when there is no free super memory block among the plurality of super memory blocks SBLK, the free super memory block list FREE_SBLK_LIST may be empty. In this case, the controller 120 may select another super memory block as the second super memory block SBLK_2.

To this end, the controller 120 may manage super memory blocks that can be selected as the second super memory block SBLK_2 as a separate list.

Figure 11:
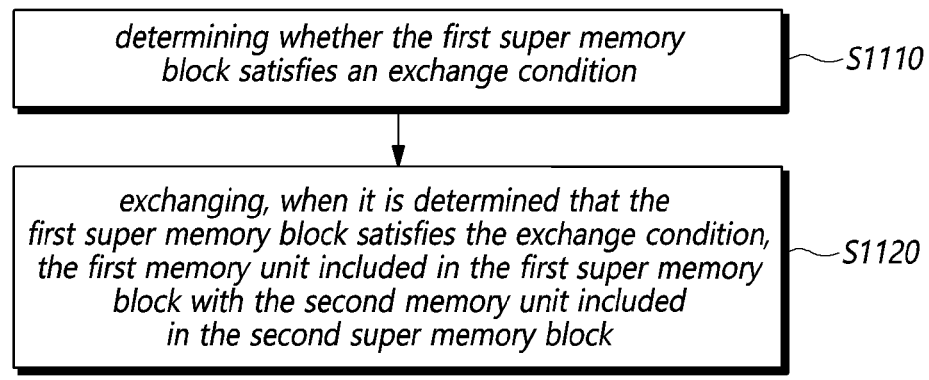
FIG. 11 is a flowchart for describing an operating method of a storage device according to embodiments of the present disclosure.

FIG. 11 is a flowchart for describing an operating method of a storage device according to embodiments of the present disclosure.

Referring to FIG. 11, the operating method of the storage device 100 may include determining whether the first super memory block SBLK_1 among the plurality of super memory blocks SBLK satisfies an exchange condition (S1110).

For example, the operation S1110 may determine that the first super memory block SBLK_1 satisfies the exchange condition when a number of bad memory units included in the first super memory block SBLK_1 is greater than or equal to a threshold value.

As another example, the operation S1110 may determine that the first super memory block SBLK_1 satisfies the exchange condition when a number of bad memory units included in the first super memory block SBLK_1 is greater, by a first value or more, than an average number of bad memory units of the plurality of super memory blocks SBLK.

Furthermore, the operation S1110 may determine whether the first super memory block SBLK_1 satisfies the exchange condition, when the first super memory block SBLK_1 becomes a free super memory block.

The operating method of the storage device 100 may include exchanging, when it is determined that the first super memory block SBLK_1 satisfies the exchange condition, the first memory unit MU_1 included in the first super memory block SBLK_1 with the second memory unit MU_2 included in the second super memory block SBLK_2 among the plurality of super memory blocks SBLK (S1120). The first memory unit MU_1 may be a bad memory unit and the second memory unit MU_2 may be a normal memory unit.

For example, the operation S1120 may determine, as the second super memory block SBLK_2, a super memory block having a smallest number of bad memory units among the plurality of super memory blocks SBLK.

As another example, the operation S1120 may determine, as the second super memory block SBLK_2, a super memory block having a smallest erase count among the N number of super memory blocks when the N number of super memory blocks have the smallest number of bad memory units among the plurality of super memory blocks SBLK.

Although embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope.

The technological scope of this disclosure is not limited by the embodiments and the accompanying drawings. The spirit and scope of the disclosure should be interpreted in connection with the appended claims and encompass all equivalents falling within the scope of the appended claims. Furthermore, the embodiments may be combined to form additional embodiments.

What is claimed is:

1. A storage device comprising:
   a memory including a plurality of memory units; and
   a controller configured to:
   set a plurality of super memory blocks each including one or more of the plurality of memory units,
   when it is determined that a first super memory block among the plurality of super memory blocks satisfies an exchange condition, distribute a bad memory unit, wherein the bad memory unit processes data with failures due to uncorrectable errors in reading, writing or performing a background operation on the data, by exchanging between the first and second super memory blocks a) a first memory unit which is the bad memory unit included in the first super memory block with b) a second memory unit which is a normal memory unit, wherein the normal memory unit is able to process the data with correctable errors, included in a second super memory block among the plurality of super memory blocks,
   wherein a number of bad memory units in the first super memory block decreases and a number of bad memory units in the second super memory block increases after exchanging the first memory unit and the second memory unit.

2. The storage device according to claim 1, wherein the first memory unit is a bad memory unit generated during runtime.

3. The storage device according to claim 1, wherein the controller is further configured to determine that the first super memory block satisfies the exchange condition when a number of bad memory units included in the first super memory block is greater than or equal to a threshold value.

4. The storage device according to claim 1, wherein the controller is further configured to determine that the first super memory block satisfies the exchange condition when a number of bad memory units included in the first super memory block is greater, by a first value or more, than an average number of bad memory units of the plurality of super memory blocks.

5. The storage device according to claim 1, wherein the controller is further configured to determine that the first super memory block satisfies the exchange condition when a difference between a maximum and a minimum of a number of bad memory units of the plurality of super memory blocks is greater than or equal to a second value, or when the maximum of a number of bad memory units of the plurality of super memory blocks is greater than or equal to a third value.

6. The storage device according to claim 1, wherein the controller is further configured to determine whether the first super memory block satisfies the exchange condition, when the first super memory block becomes a free super memory block.

7. The storage device according to claim 1, wherein the controller is further configured to determine that the first super memory block satisfies the exchange condition, when a bad memory unit in the first super memory block is registered, an idle time exceeds a specific time, the storage device is booted up, the storage device is powered off, or a background operation is performed.

8. The storage device according to claim 1, wherein the controller is further configured to determine, as the second super memory block, a super memory block having a smallest number of bad memory units among the plurality of super memory blocks.

9. The storage device according to claim 1, wherein the controller is further configured to determine, as the second super memory block, a super memory block having a smallest erase count among N super memory blocks having a smallest number of bad memory units among the plurality of super memory blocks, where N is a natural number greater than or equal to 2.

10. The storage device according to claim 1, wherein the controller is further configured to insert, after the exchange, information of the first super memory block to a free super memory block list.

11. An operating method of a storage device, the operating method comprising:
    determining whether a first super memory block among a plurality of super memory blocks each including a plurality of memory units satisfies an exchange condition; and
    when it is determined that the first super memory block satisfies the exchange condition, distributing a bad memory unit, wherein the bad memory unit processes data with failures due to uncorrectable errors in reading, writing or performing a background operation on the data, by exchanging between the first and second super memory blocks a) a first memory unit which is the bad memory unit included in the first super memory block with b) a second memory unit which is a normal memory unit, wherein the normal memory unit is able to process the data with correctable errors, included in a second super memory block among the plurality of super memory blocks,
    wherein a number of bad memory units in the first super memory block decreases and a number of bad memory units in the second super memory block increases after exchanging the first memory unit and the second memory unit.

12. The operating method according to claim 11, wherein the first super memory block is determined to satisfy the exchange condition when a number of bad memory units included in the first super memory block is greater than or equal to a threshold value.

13. The operating method according to claim 11, wherein the first super memory block is determined to satisfy the exchange condition when a number of bad memory units included in the first super memory block is greater, by a first value or more, than an average number of bad memory units of the plurality of super memory blocks.

14. The operating method according to claim 11, wherein the determining is performed when the first super memory block becomes a free super memory block.

15. The operating method according to claim 11, further comprising determining, as the second super memory block, a super memory block having a smallest number of bad memory units among the plurality of super memory blocks.

16. The operating method according to claim 11, further comprising determining, as the second super memory block, a super memory block having a smallest erase count among N super memory blocks having a smallest number of bad memory units among the plurality of super memory blocks, where N is a natural number greater than or equal to 2.

17. A storage device comprising:
    a memory including at least first and second super memory blocks; and
    a controller configured to distribute a bad memory block, wherein the bad memory block processes data with failures due to uncorrectable errors in reading, writing or performing a background operation on the data, when the first super memory block has a greater number of bad memory blocks than a threshold, by exchanging between the first and second super memory blocks a) one of the bad memory blocks in the first super memory block with b) a normal memory block, wherein the normal memory block is able to process the data with correctable errors, having a least number of erase counts within the second super memory block, the second super memory block having a lower number of bad memory blocks than the first super memory block, wherein a number of bad memory blocks in the first super memory block decreases and a number of bad memory blocks in the second super memory block increases after exchanging the one of the bad memory blocks in the first super memory block with the normal memory block having a least number of erase counts within the second super memory block.

18. The storage device according to claim 1, wherein the exchanging of a) the first memory unit which is the bad memory unit included in the first super memory block with b) the second memory unit which is a normal memory unit included in a second super memory evenly distributes bad blocks between the plurality of super memory blocks.

* * * * *